United States Patent
Shields

(10) Patent No.: US 6,324,021 B1
(45) Date of Patent: Nov. 27, 2001

(54) FOCUSING SYSTEM

(76) Inventor: Lorvel J. Shields, 2140 Shore Dr., Anchorage, AK (US) 99515

( * ) Notice: Subject to any disclaimer, the term of this patent is extended or adjusted under 35 U.S.C. 154(b) by 0 days.

(21) Appl. No.: 09/657,849

(22) Filed: Sep. 8, 2000

Related U.S. Application Data

(60) Provisional application No. 60/153,010, filed on Sep. 9, 1999.

(51) Int. Cl.$^7$ ..................................... G02B 7/02
(52) U.S. Cl. ........................................... 359/819; 359/823
(58) Field of Search ................... 359/643, 819, 359/822, 823

(56) References Cited

U.S. PATENT DOCUMENTS

| | | | |
|---|---|---|---|
| 3,604,795 | 9/1971 | Crandall | 353/76 |
| 3,634,008 | 1/1972 | Plummer | 355/56 |
| 3,717,400 | 2/1973 | Schutrum et al. | 359/823 |
| 4,580,891 | 4/1986 | Fukunaga et al. | 355/57 |
| 4,614,424 | 9/1986 | Endo et al. | 355/56 |
| 4,854,672 | 8/1989 | Daikoku | 359/814 |
| 6,919,013 | * 7/1999 | Savoie | 409/141 |

FOREIGN PATENT DOCUMENTS 6-201970-A  *  7/1994  (JP)  .................. G02B/7/04

* cited by examiner

*Primary Examiner*—Ricky Mack
(74) *Attorney, Agent, or Firm*—Ankerman Senterfitt

(57) ABSTRACT

A focusing system for optical devices in which quick, precise focusing is enabled through the use of a spindle-cord member combination system designed to prevent backlash. The system includes a spindle engageable by an operator which is rotatable around a spindle axle, and a lens mount. The spindle axle can be attached to a support member. A cord member can adjustably engage the spindle, and be attached at each end of the lens mount. The lens mount can slide along the support member. In addition, an eye piece assembly can be attached to the sled and moveable with the lens mount, as the lens mount is adjusted by rotation of the spindle.

8 Claims, 1 Drawing Sheet

FOCUSING SYSTEM

CROSS REFERENCE TO RELATED APPLICATIONS

This application claims the benefit of U.S. Patent Provisional Application Ser. No. 60/153,010, filed on Sep. 9, 1999.

STATEMENT REGARDING FEDERALLY SPONSORED RESEARCH OR DEVELOPMENT (Not Applicable)

BACKGROUND OF THE INVENTION

Acute focus is necessary in order to achieve the maximum resolution of optical devices used to enhance human vision, such as monoculars, binoculars, telescopes, and microscopes. In practice, acute focus is achieved by a step-wise method, frequently known as "rocking". During the rocking method, a focusing mechanism is moved in one direction until an image comes into focus, and then beyond the point of focus to the point where the image begins to degrade. The direction of focus is then reversed, and the process is repeated until the operator has established that the best possible image has been achieved. The nature of rocking can cause the components of an optical device to experience backlash, which can be defined as the play resulting from loose connections between mechanical elements in the optical device. Backlash can be particularly problematic in the focusing mechanism of an optical device. Current focusing devices which employ screw threads or rack and pinion gears are particularly susceptible to backlash.

SUMMARY OF THE INVENTION

It is an object of the subject invention to provide an optical focusing system which enables superior speed in focusing.

It is a further object of the subject invention to provide an optical focusing system with a reduced amount of backlash.

It is another object of the subject invention to have a focusing system which is designed to reduce or eliminate slippage in the slideable components of the system.

According to these an other objects of the invention, the present invention relates to a focusing system for optical devices, including monoculars, binoculars, telescopes, and microscopes. According to one aspect of the present invention, the optical focusing system includes an objective lens assembly, and an eyepiece lens assembly mounted in axial alignment with respect to the objective lens assembly. The system also includes a lens mount for receiving the eyepiece lens assembly. The eyepiece lens assembly can slidably mount into the lens mount, and the lens mount can be adapted to allow linear movement of the eyepiece lens assembly with respect to the objective lens assembly, within a predetermined distance.

The system also includes a spindle, which can be rotatably mounted in the eyepiece lens assembly and extend through the lens mount. A knob portion for rotating the spindle can be fixedly attached to the spindle. The knob portion can be manually operable. The system can also have linkage which transmits rotational movement of the spindle, causing linear movement of the eyepiece lens assembly with respect to the objective lens assembly. Rotation of the spindle can selectively vary the distance between the eyepiece lens assembly and the objective lens to select the desired plane of focus. The linkage can include a longitudinally disposed cord which is fixedly and tautly attached to opposite ends of the lens mount. The cord can be wound around the spindle at least one revolution. Rotational movement of the spindle causes the spindle to move along the length of the cord.

According to another embodiment of the invention, an optical focusing system having focusing structure includes a spindle engageable by an operator which is rotatable around a spindle axle, and a sled. The spindle axle can be attached to a support member. A cord member can adjustably engage the spindle, and be attached at each end of the sled. The sled can slide along the support member. In addition, an eye piece assembly can be attached to the sled and moveable with the sled, as the sled is adjusted by rotation of the spindle. The cord member can be wrapped around the spindle at least one revolution, however, the invention is not limited in that regard. In addition, the cord member can be composed at least partially of aramid, or at least partially of metal.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF EMBODIMENTS

The present invention relates to a focusing system for optical devices, including monoculars, binoculars, telescopes, and microscopes. In certain situations, it is desirable to be able to rapidly focus an optical device over a considerable range of distance, such as when observing small, rapidly moving insects or birds. The system according to the present invention provides for quick, precise focusing, and can alleviate or eliminate the problem of backlash.

Figure 1:
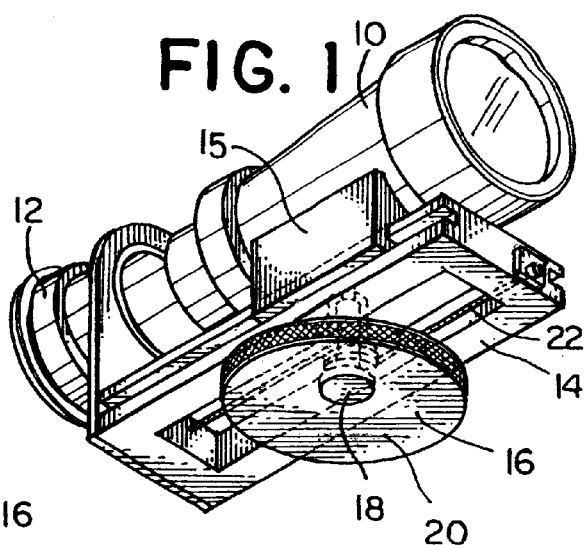
FIG. 1 is a perspective view of a focusing system according to the invention.
Figure 2:
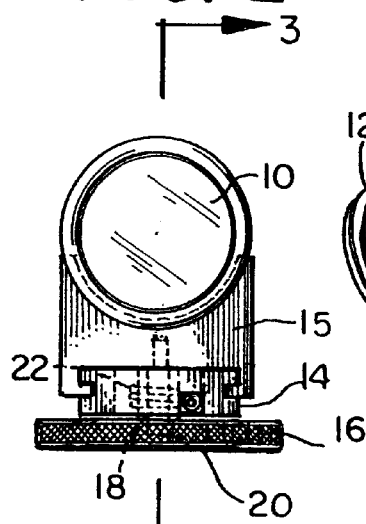
FIG. 2 is a front view of the focusing system of FIG. 1.

As shown in FIGS. 1–2, the optical focusing system of the present invention includes an objective lens assembly 10 and an eyepiece lens assembly 12. The objective lens assembly 10 and the eyepiece lens assembly 12 can each be any suitable lens having any size and any suitable degree of magnification. The eyepiece lens assembly 12 can be mounted in axial alignment with respect to the objective lens assembly 10.

The system also has a lens mount 14 for receiving the eyepiece lens assembly 12. The eyepiece lens assembly 12 can slidably mount onto or into the lens mount 14 in any suitable manner. In one arrangement, the lens mount 14 can be adapted to allow linear movement of the eyepiece lens assembly 12 with respect to the objective lens assembly 10, within a predetermined distance. Increasing the distance between the objective lens assembly 10 and the eyepiece lens assembly 12 can increase the sharpness of focus achieved by the system.

The system can have a lens mount guide 15, which allows the lens mount 14 to traverse the sled in any suitable manner. For example, the lens mount guide 15 can be configured to allow the lens mount 14 to slide linearly or curvilinearly along a surface of the lens mount 14, or along a slot within the lens mount 14. In one embodiment, a portion of the lens mount guide 15 can be connected to the objective lens assembly 10 in any suitable manner, including but not limited to pivotally or fixedly. In such an arrangement, movement of the lens mount 14 modifies the distance between the objective lens assembly 10 and the eyepiece lens assembly 12, thereby changing the focus of the system.

Figure 3:
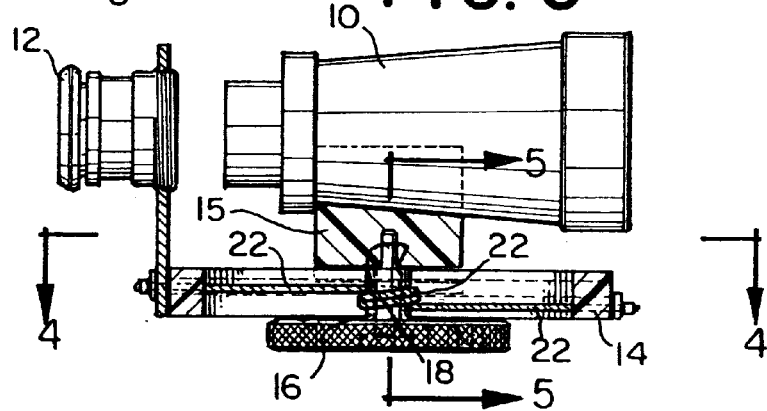
FIG. 3 is a cross-sectional of the focusing system of FIG. 1 taken along the line 3—3 of FIG. 2.
Figure 4:
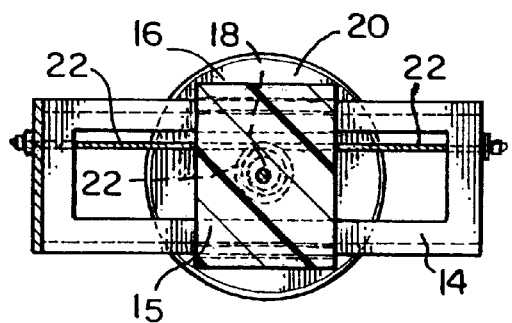
FIG. 4 is a cross-sectional of the focusing system of FIG. 1 taken along the line 4—4 of FIG. 3.
Figure 5:
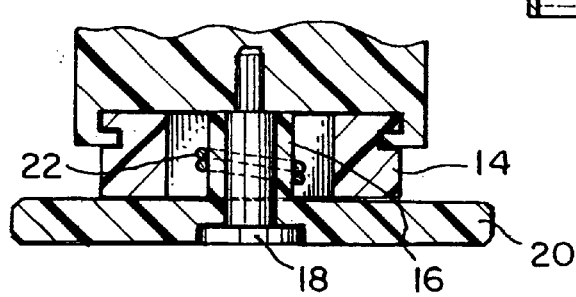
FIG. 5. is a cross-sectional of the focusing system of FIG. 1 taken along the line 5—5 of FIG. 3.

As shown in FIGS. 3–5, the system also includes a spindle 16 rotatable about a spindle axle 18. During operation, the performance of the focusing system can be improved by positioning the system so that the spindle axle 18 is substantially horizontal. The spindle axle 18 can be attached to the lens mount guide 15 or the lens mount 14 in any suitable manner. For example, the spindle axle 18 can be attached to the lens mount guide 15 with a screw, bolt, or other fastener. The spindle 16 can be rotatably mounted in or near the eyepiece lens assembly 12, and can extend through the lens mount 14 in any suitable manner. It is understood that the invention is not limited to any particular mounting configuration, as the spindle 16 can attached to the lens mount 14 in any suitable manner. A knob portion 20 for rotating the spindle 16 can be fixedly attached to the spindle 16. The knob portion 20 can be manually operable, and can be any size or shape suitable for rotating the spindle 16.

The previously described components of the system can be composed of any suitable materials. In a preferred embodiment, the components can be composed primarily of injected molded plastics or machined from low friction plastics, such as Teflon® or acetal, as such materials prevent the need for lubrication of the components.

The system also has linkage which transmits rotational movement of the spindle 16, causing linear movement of the eyepiece lens assembly 12 with respect to the objective lens assembly 10. Rotation of the spindle 16 can selectively vary the distance between the eyepiece lens assembly 12 and the objective lens assembly 10 to select the desired plane of focus. The linkage can include a longitudinally disposed cord 22. The cord many be made of any suitable material. For example, the cord 22 may be composed at least partially of metal, or at least partially of Kevlar® (which is composed at least partially of aramid).

In one arrangement, the cord 22 is fixedly and/or tautly attached to the lens mount 14. For example, each end of the cord 22 can be fixedly and/or tautly attached to opposite ends of the lens mount 14. An unattached portion of the cord 22 can be wound around the spindle 16, and is preferably wound around the spindle 16 for at least one complete revolution.

Rotational movement of the spindle 16 causes the spindle 16 to move along the length of the cord 22. The cord 22 can be attached to the spindle 16 in a manner that prevents the cord 22 from moving along the length of the spindle 16 while the spindle 16 is rotating. As the cord 22 is under tension while the spindle 16 rotates, the lens mount 14 can have a substantially similar rotation to that of the spindle, allowing movement of the lens mount 14 back and forth with reduced backlash. In some arrangements, backlash can be substantially eliminated.

It should be understood that the examples and embodiments described herein are for illustrative purposes only and that various modifications or changes in light thereof will be obvious to persons skilled in the art, and that such modifications or changes are to be included within the spirit and purview of this application. Moreover, the invention can take other specific forms without departing from the spirit or essential attributes thereof.

What is claimed is:

1. An optical focusing system, comprising:

an objective lens assembly;

an eyepiece lens assembly mounted in axial alignment with respect to said objective lens assembly;

a lens mount for receiving said eyepiece lens assembly, said eyepiece lens assembly slidably mounted to said lens mount, said lens mount being adapted to allow linear movement of said eyepiece lens assembly with respect to said objective lens assembly within a predetermined distance;

a spindle rotatably mounted in said eyepiece lens assembly and extending through said lens mount;

a knob portion fixedly attached to said spindle, wherein said knob portion is operable to rotate said spindle; and linkage to transmit rotational movement of said spindle to cause linear movement of said eyepiece lens assembly with respect to said objective lens assembly, whereby rotation of said spindle can selectively vary the distance between said eyepiece lens assembly and said objective lens assembly to select the desired plane of focus, said linkage comprising a longitudinally disposed cord fixedly and tautly attached to opposite ends of said lens mount, said cord wound around said spindle at least one revolution, whereby rotational movement to said spindle causes said spindle to move along the length of said cord.

2. The system of claim 1, wherein at least one of said objective lens assembly, said eyepiece lens assembly, said lens mount, said spindle, and said knob portion are comprised at least partially of acetal.

3. The system of claim 1, wherein said knob portion is manually operable.

4. An optical focusing system having focusing structure, comprising:

a spindle engagable by an operator which is rotatable around a spindle axle, said spindle axle being attached to a support member;

a cord member adjustably engaging said spindle, said cord member being attached at each end of a lens mount, wherein said lens mount is slideable along said support member; and an eye piece assembly attached to said lens mount and moveable with said lens mount as said lens mount is adjusted by rotation of said spindle.

5. The system of claim 4, wherein said cord member is at least partially comprised of aramid.

6. The system of claim 4, wherein said cord member is at least partially comprised of metal.

7. The system of claim 4, wherein said cord member is wrapped around said spindle at least one revolution.

8. The system of claim 2, wherein at least one of said eyepiece lens assembly, said lens mount, said spindle, and said spindle axle are comprised at least partially of acetal.

* * * * *